United States Patent [19]
Zumeris et al.

[11] Patent Number: 5,696,421
[45] Date of Patent: Dec. 9, 1997

[54] MULTI-AXIS ROTATION DEVICE

[75] Inventors: Jona Zumeris, Nesher; Izhak Rafeli, Haifa, both of Israel

[73] Assignee: Nanomotion, Ltd., Haifa, Israel

[21] Appl. No.: 630,406

[22] Filed: Apr. 1, 1996

[51] Int. Cl.$^6$ .................................................. H01L 41/08
[52] U.S. Cl. .......................... 310/328; 310/323; 310/331; 310/366
[58] Field of Search ...................... 310/328, 323, 310/330–332, 366, 369

[56] References Cited

U.S. PATENT DOCUMENTS

| | | |
|---|---|---|
| 3,304,773 | 2/1967 | Rogallo ............................. 310/331 X |
| 3,928,778 | 12/1975 | Ivanov et al. ......................... 310/331 |
| 4,621,926 | 11/1986 | Merry et al. .......................... 356/363 |
| 4,727,278 | 2/1988 | Staufenberg, Jr. et al. ............. 310/328 |
| 4,785,177 | 11/1988 | Besocke ............................ 310/330 X |
| 4,798,989 | 1/1989 | Miyazaki ............................. 310/328 |
| 5,041,753 | 8/1991 | Clark et al. .......................... 310/328 |
| 5,043,621 | 8/1991 | Culp ................................. 310/316 |
| 5,136,201 | 8/1992 | Culp ................................. 310/328 |
| 5,182,484 | 1/1993 | Culp ................................. 310/328 |
| 5,237,236 | 8/1993 | Culp ................................. 310/317 |
| 5,241,235 | 8/1993 | Culp ................................. 310/328 |
| 5,260,622 | 11/1993 | West ................................. 310/328 |
| 5,453,653 | 9/1995 | Zumeris .............................. 310/323 |

FOREIGN PATENT DOCUMENTS

| | | |
|---|---|---|
| 0 347 846 A3 | 12/1989 | European Pat. Off. . |
| 0 424 609 A1 | 5/1991 | European Pat. Off. . |
| 2-265969 | 5/1992 | Japan . |
| 693493 | 10/1979 | U.S.S.R. . |

*Primary Examiner*—Mark O. Budd
*Attorney, Agent, or Firm*—Wilson Sonsini Goodrich & Rosati

[57] ABSTRACT

A multiaxis rotation device for rotating a curved element about two, orthogonal axes is provided. The device includes two pairs of motors and two pairs of axis defining units, where each pair of axis defining units are placed on opposite ends of a line along one of the two orthogonal axes. The axis defining units each include a support for the curved element and apparatus for pressing the support against and pulling the support away from the curved element. The pulling away occurs when the motors corresponding to the axis defining unit are not providing rotation about the axis defined by the axis defining unit.

14 Claims, 11 Drawing Sheets

MULTI-AXIS ROTATION DEVICE

FIELD OF THE INVENTION

The present invention relates to multiaxis rotation devices generally and to such devices utilizing piezoelectric ceramics in particular.

BACKGROUND OF THE INVENTION

Piezoelectric motors are known in the art. SU 693493 describes a piezoelectric motor comprising a flat rectangular piezoelectric plate having one electrode covering essentially all of one large face of the plate ("the back face") and four electrodes each covering a quadrant of the front face. The back electrode is grounded and the electrodes of the front face are electrically connected on the diagonal. Two ceramic pads are attached to one of the long edges of the plate and these pads are pressed against the object to be moved by a spring mechanism which presses the other long edge.

The long and short axes of the piezoelectric ceramic have similar resonant frequencies (for different mode orders) such that, when one pair of connected electrodes is excited with an alternating current (AC) voltage to which the ceramic is responsive, the object moves in one direction, and when the other pair of electrodes is excited, the object moves in the other direction.

U.S. Pat. No. 4,727,278 to Staufenberg, Jr. et al. describes a multiaxis translation apparatus utilizing piezoelectric transducers to rotate a spherical element. Their multiaxis apparatus includes three or four piezoelectric driving units, each one having three piezoelectric transducers therein and a driven element receiving the force of the piezoelectric transducers and transferring it to the sphere to be rotated.

SUMMARY OF THE PRESENT INVENTION

It is an object of the present invention to provide a piezoelectric transducer apparatus for providing two-dimensional movement to spherical and other shaped objects.

There is therefore provided, in accordance with the present invention, a multiaxis rotation device for rotating a curved element about two, orthogonal axes. The device includes two pairs of motors and two pairs of axis defining units, where each pair of axis defining units are placed on opposite ends of a line along one of the two orthogonal axes. The axis defining units each include a support for the curved element and apparatus for pressing the support against and pulling the support away from the curved element. The pulling away occurs when the motors corresponding to the axis defining unit are not providing rotation about the axis defined by the axis defining unit.

In one embodiment of the present invention, the apparatus for pressing is formed of a piezoelectric ceramic and the support is formed of a bearing and a curved support element. The piezoelectric ceramic is formed of a base, mounted onto the bearing, and a hollow extension extending within the center of the bearing. The piezoelectric ceramic can alternatively be just formed of a base.

The motors can be any appropriate motor which can rotate the axis defining unit and/or the curved element. In one embodiment, the motors are piezoelectric ceramic motors. They can either push against the bearing and, through that, cause the curved element to rotate. Alternatively, they can directly rotate the curved element. They can be located within the bearing, pushing on its inner race, or they can push against the outer race.

In a further embodiment, each motor is located at the center of the bearing and presses directly against the curved element. The motors in this embodiment provide the highest moment since they cause rotation, not about the axis defined by the axis defining unit in which they reside, but about the other axis.

As mentioned hereinabove, the motors can be located apart from the axis defining units. In this embodiment, the motors press directly against the curved element and the axis defining units only provide a point about which to rotate. The support of the axis defining unit can have an apex or a few points which touch the curved element.

In a further embodiment of the present invention, the multiaxis rotation device includes two pairs of rotation devices for rotating the curved element about the two orthogonal axes. Each pair of rotation devices is located at opposite ends of diagonals along the orthogonal axes and each rotation device includes a support and at least three piezoelectric ceramic motors. The support has an apex for supporting the curved element. The piezoelectric ceramic motors are located equidistantly from the apex and are capable of pressing against, pulling away from and rotating the curved element.

Finally, in another embodiment of the present invention, the multiaxis rotation device operates on any type of body and includes a first frame having first axles connected to the body along the first axis and a second frame having second axles connected to the first frame along the second axis. In addition, the device includes pairs of piezoelectric ceramic motors operating on each of the first and second axles. The motors are located within the appropriate one of the first and second frames.

BRIEF DESCRIPTION OF THE DRAWINGS

The present invention will be understood and appreciated more fully from the following detailed description taken in conjunction with the drawings in which:

FIGS. 14 and 15 are taken in the directions of the arrows XIV and XV of FIGS. 13 and 14, respectively;

DETAILED DESCRIPTION OF PREFERRED EMBODIMENTS

Figure 1:
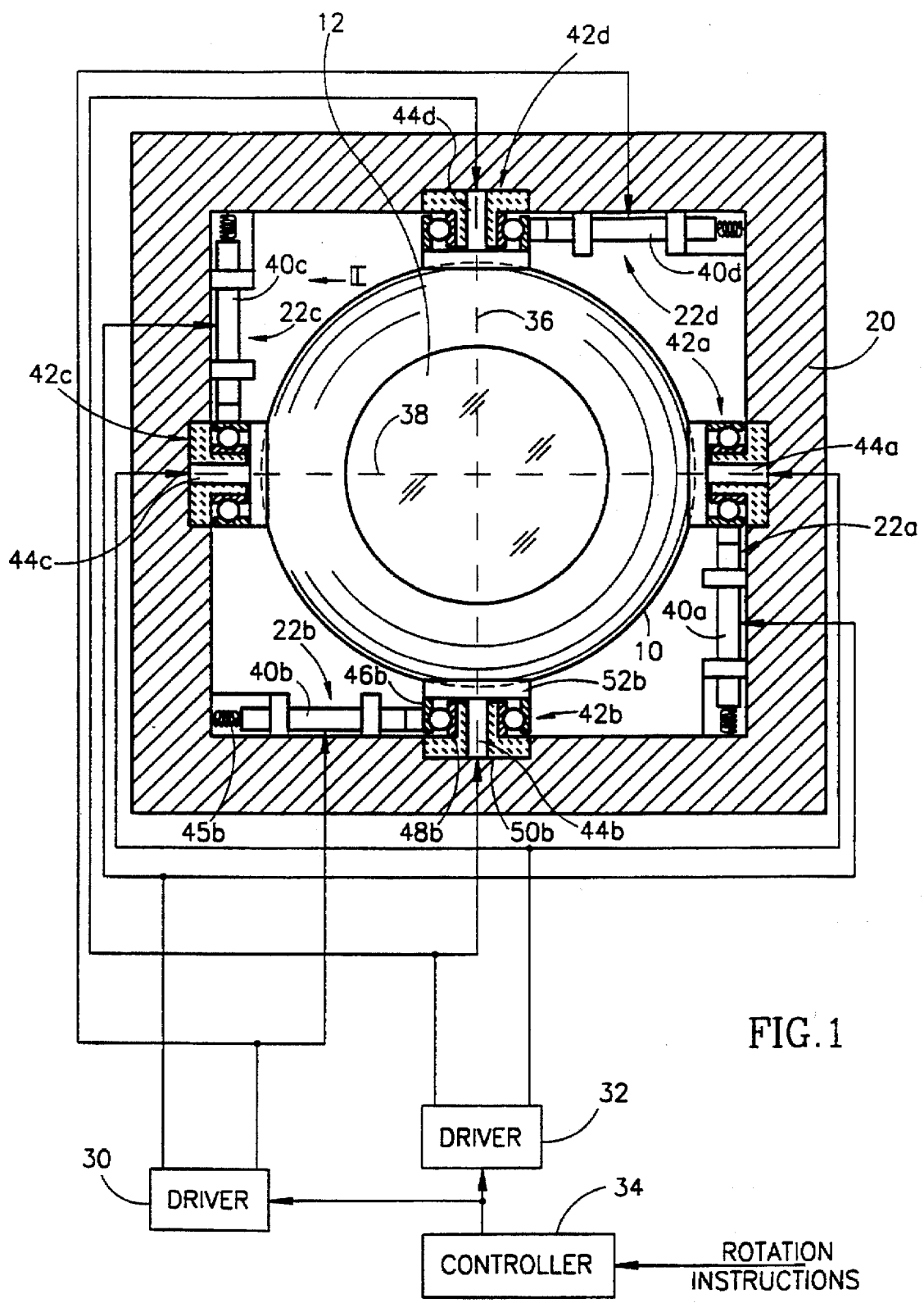
FIG. 1 is a partially block diagram, partially schematic illustration of a multiaxis rotation device, constructed and operative in accordance with a preferred embodiment of the present invention, for rotating at least partially spherical object.

Reference is now made to FIG. 1 which illustrates a multiaxis rotation device, constructed and operative in accordance with a preferred embodiment of the present invention. In FIG. 1, the device of the present invention is shown providing two-dimensional movement to a partially spherical element 10, such as a housing for a lens 12. It will be appreciated that the teachings of the present invention are applicable to any situation having multiaxis rotation and a curved surface to be translated.

The device of FIG. 1 comprises a housing 20, four rotation units 22a, 22b, 22c and 22d, two drivers 30 and 32, and a controller 34. The four rotation units are divided into two pairs, where each pair operates to provide movement about one axis. Thus, units 22b and 22d provide rotation about an axis 36 and units 22a and 22c provide rotation about an axis 38 perpendicular to axis 36.

Each rotation unit 22 comprises a motor 40 and an axis defining unit 42, where the motors and axis defining units are labeled a–d in accordance with the rotation unit 22 to which they belong. Each axis defining unit 42 provides support to the spherical element 10 and rotation about a central axis 44 which coincides with one of axes 36 and 38.

The motors 40 can be any suitable motor which can rotate the outer race of a bearing, as described hereinbelow. For example, motors 40 can be ceramic motors, such as the SP-4 motor manufactured by Nanomotion Ltd. of Haifa, Israel, assignees of the present invention. When the motors 40 rotate the corresponding bearing units 42 they rotate the spherical element 10 around the axes defined by the axes of the bearing units 42. If the motors 40 are ceramic, they typically include a spring 45 which pushes against housing 20, thereby to provide a pre-load to the motors.

Each axis defining unit 42 comprises an inner and an outer race, 46 and 48, respectively, a friction changing unit 50 connected to the inner race 48, and a support 52,mounted on the outer race 48. The spherical element 10 sits on the support 52 and thus, when the piezoelectric motor 22 pushes against the outer race 46, the spherical element 10, which sits on the support 52, turns.

The friction changing unit 50 can be any unit which changes the friction between the spherical element 10 and the support 52. When the associated motor 40 is activated to rotate the bearing unit 42, friction changing unit 50 pushes the support 52 against the spherical element 10 thereby to increase the friction between support 52 and spherical element 10. When the associated motor 40 is not activated but other motors are, the unit 50 pulls away from support 52, thereby to reduce the friction between support 52 and spherical element 10. The driver 32 controls the activation of the units 50 and driver 30 controls the activation of the motors, as described in more detail hereinbelow.

In one embodiment of the present invention, the friction changing unit 50 is a piezoelectric ceramic element, which changes shape in the presence of voltage. As will be described in more detail hereinbelow, when the base of the ceramic element expands, it pushes the inner race 48 of the bearing towards the spherical element 10, thereby increasing the friction. The opposite occurs when the base contracts.

Other types of friction changing units can also be utilized and are incorporated into the present invention.

It is noted that the present invention rotates the spherical element 10 about the axes 36 or 38 individually. To do so, two opposite bases 50 are activated to push towards and the remaining two are activated to pull away from the spherical element 10.

Figure 2:
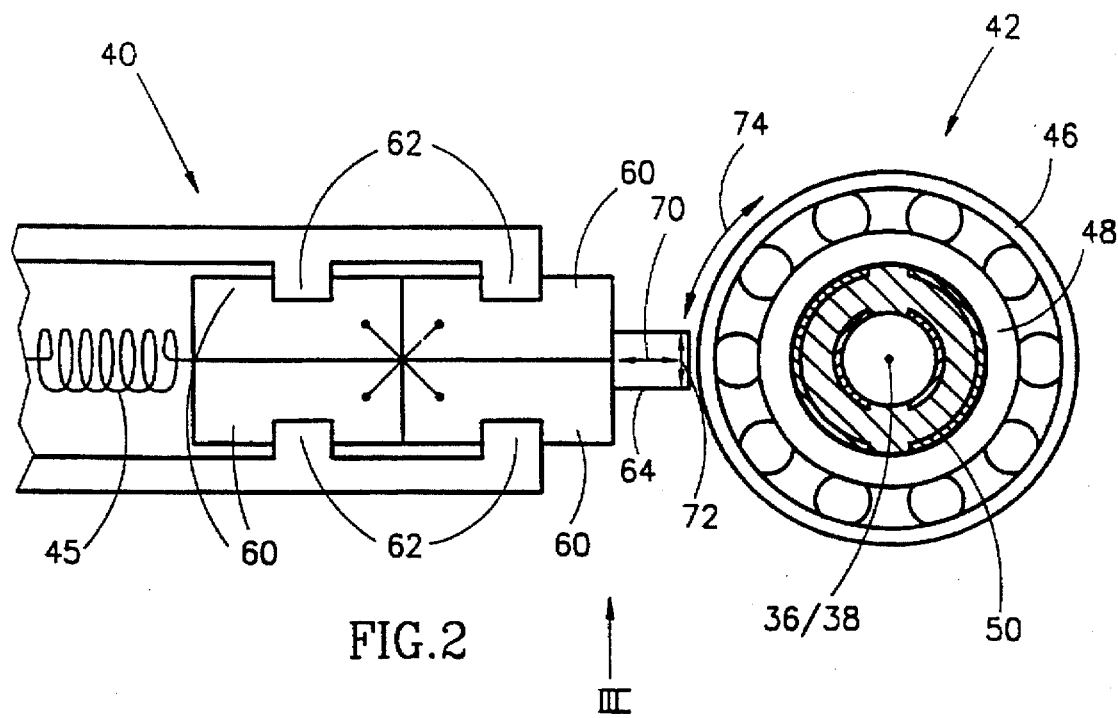
FIG. 2 is a schematic top view illustration, taken in the direction of arrow II of FIG. 1, of one rotation unit forming part of the device of FIG. 1.
Figure 3:
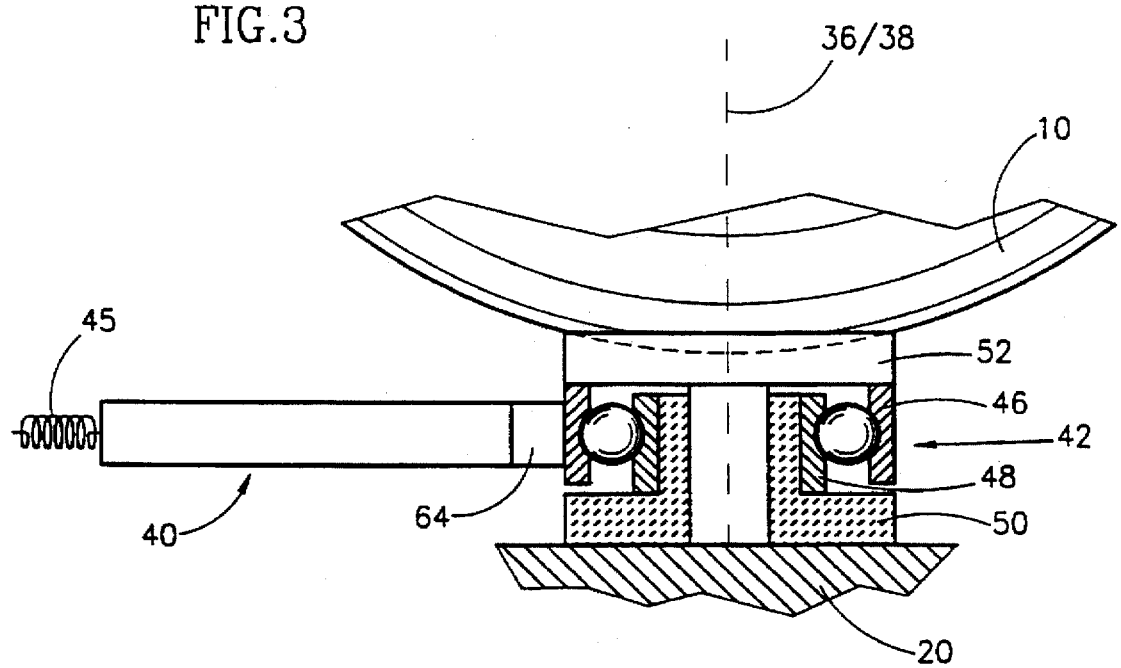
FIG. 3 is a schematic side view illustration, taken in the direction of arrow III of FIG. 2, of one rotation unit forming part of the device of FIG. 1.

Reference is now made to FIG. 2 which is a top view, taken in the direction marked by arrow II of FIG. 1, and to FIG. 3 which is a detailed side view, taken in the direction of arrow III of FIG. 2, of one of the rotation units 22. In the embodiment of FIG. 2, the ceramic motor 40 is of the type described in Israel Patent Application 106,296, incorporated herein by reference; however, other types of ceramic motors 40 can also be utilized.

As described in Israel Patent Application 106,296, the ceramic motor 40 has four piezoelectric plates 60, supports 62 located at the zero positions of the standing waves induced in the plates 60, a driving element 64 at the front end and spring 45, for pre-loading purposes, at the rear. In operation, the ceramic motor 40 pushes the driving element 64 in a periodic motion comprising a push (arrow 70) towards the outer race 46 of bearing unit 42, thereby to engage it, followed by a pull (arrow 72) towards one side, thereby to rotate the outer race 46, as indicated by arrow 74, about the relevant axis 36 or 38. The periodic motion ends with a disengagement (arrow 70) from the outer race 46. Since the periodic motion repeats at a high frequency, such as 20–150 KHz, the ceramic motor 40 can fully rotate the bearing unit 42, and thus, can fully rotate the spherical element 10 about one axis 36 or 38. The inner race 48, which is attached to the friction changing unit 50 which, in turn, is attached to the housing 20 (FIGS. 1 and 3), remains stationary with respect to the rotation about axis 36 or 38. However, due to the expansion and contraction of friction changing unit 50, detailed hereinbelow, inner race 48 translates along the relevant axis 36 or 38, thereby to press the support 52 towards or slightly release it from the spherical element 10.

Support 52 can have any desired shape. In the embodiment of FIG. 3, it has an indentation whose curve matches that of the spherical element 10.

Figure 4:
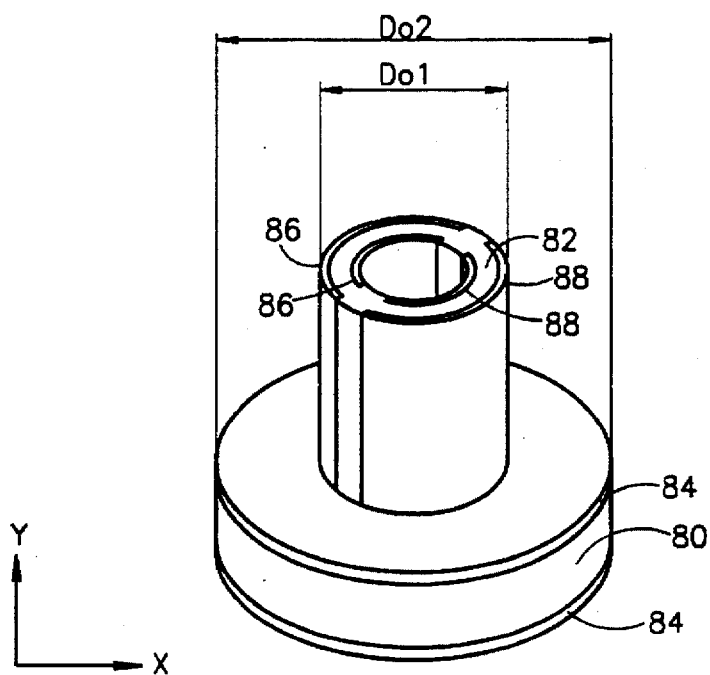
FIG. 4 is a schematic illustration of a friction changing unit forming part of the driver apparatus of FIGS. 2 and 3.

Reference is now made to FIG. 4 which details the friction changing unit 50 and to FIGS. 5A, 5B, 6A and 6B which illustrate a number of states of the friction changing unit 50. The friction changing unit 50 comprises a wide and flat ceramic base 80 of outer diameter Do2, a tall cylindrical shaped ceramic extension 82 of outer diameter Do1, and pairs 84, 86 and 88 of electrodes. Ceramic elements 80 and 82 can be integrally connected together forming the shape shown in the previous figures or they can be formed of separate elements.

Pair 84 of electrodes are located on the top and bottom of ceramic base 80. Pairs 86 and 88 are located on each of two sides of ceramic extension 82. Pair 86 is shown on the left side of extension 82 and pair 88 is shown on the right side. Pairs 86 and 88 each have one electrode covering part of the inner diameter of ceramic extension 82 and the second electrode covering the corresponding part of the outer diameter of ceramic extension 82.

As described in more detail hereinbelow with respect to FIGS. 7A and 7B, the electrodes 84–88 are activated with alternating voltage thereby to induce waves in the ceramic elements of the friction changing unit 50. Them are two types of waves, transverse and longitudinal waves. When the electrodes 84–88 are activated at a frequency which matches the natural frequency of the elements 80 and 82, the induced waves will be standing waves.

In order to clearly present how the elements 80 and 82 move in response to electrical activation, the following discussion will assume constant activation in one direction. It will be appreciated that the activation direction continually changes in accordance with the alternating current signal provided to the electrodes 84–88.

Figures 5A, 5B:
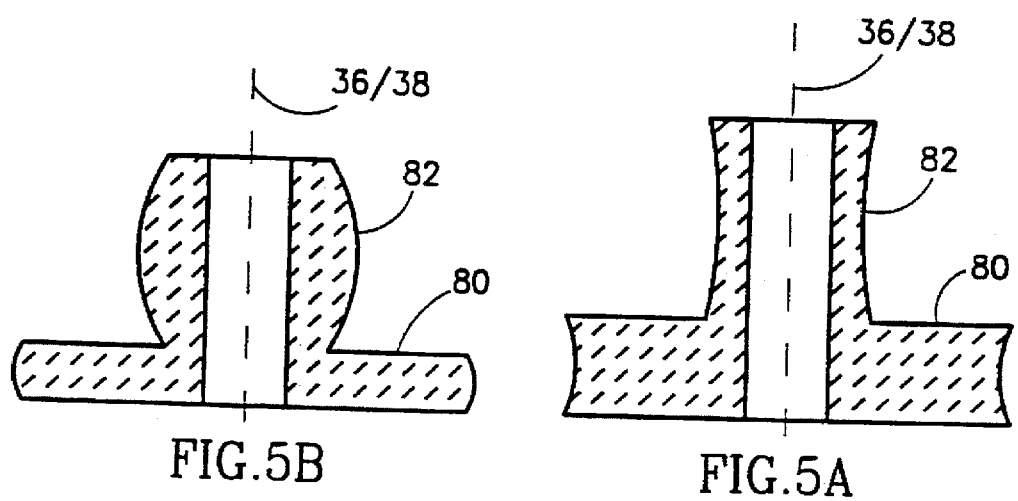
FIGS. 5A, 5B are schematic illustrations of the expansion and contraction of a base portion of the friction changing unit of FIG. 4.

When pair 84 of electrodes are activated, they induce longitudinal waves in elements 80 and 82. In one activation direction, the longitudinal waves cause ceramic base 80 to expand along axis 36 or 38, as indicated by FIG. 5A. There may be a corresponding slight shrinkage in width of ceramic extension 82. The expansion of base 80 provides inward motion to the bearing 42, pressing it against the spherical element 10. When pair 84 of electrodes are activated in the opposing direction, the longitudinal wave causes ceramic base 80 to contract (and ceramic extension 82 to slightly expand in width), as indicated by FIG. 5B. The contraction of base 80 provides outward motion to the bearing 42, pulling it away from the spherical element 10.

Figures 6A, 6B:
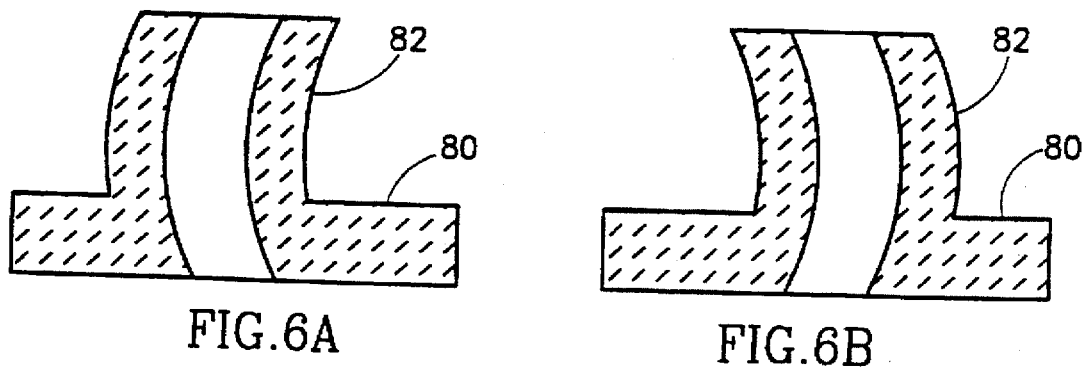
FIGS. 6A and 6B are schematic illustrations of the movement of an extension portion of the friction changing unit of FIG. 4.

When pairs 86 and 88 of electrodes are activated, they induce transverse waves in elements 80 and 82. In one activation direction, ceramic extension 82 bends to the left, as indicated by FIG. 6A. Bent extension 82 pushes against the motion of driving element 64 as driving element 64 pushes against the bearing 42. When pairs 86 and 88 of electrodes are activated in the opposite direction, the opposite occurs and extension 82 bends toward the right, away from the driving element 64.

When the pairs 84–88 are activated together, a combined expansion and contraction occurs.

Figure 7A:
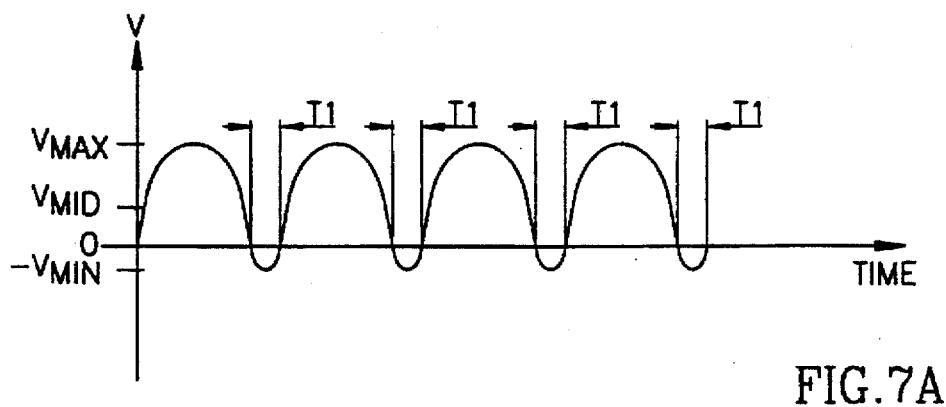
FIGS. 7A and 7B are timing diagrams of the activation of the friction changing unit of FIG. 4.
Figure 7B:
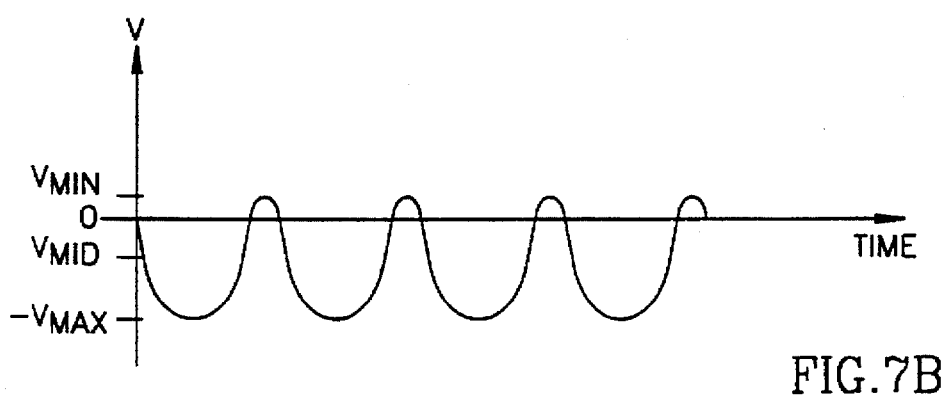

Reference is now briefly made to FIGS. 7A and 7B which illustrate the timing signals provided to electrodes 84. The signals are shown on a graph of voltage vs. time, where the signals range from −Vmin to Vmax.

As can be seen, the signals are symmetric. However, they are not symmetric about a zero value but rather about a positive or negative Vmid value (FIG. 7A or 7B, respectively). The signal of FIG. 7A provides expansion most of the time; it provides contraction for the short time, T1, during which the signal is negative. The signal of FIG. 7B provides contraction most of the time.

It will be appreciated that the multiaxis rotation device of the present invention defines the axes of rotation with the bearings and provides rotation by rotating the bearings. When single axis rotation is desired, the friction changing units pull the bearings of the non-rotating axis slightly away from the element to be rotated so as to reduce the load on the motors of the axis of desired rotation.

Figure 8:
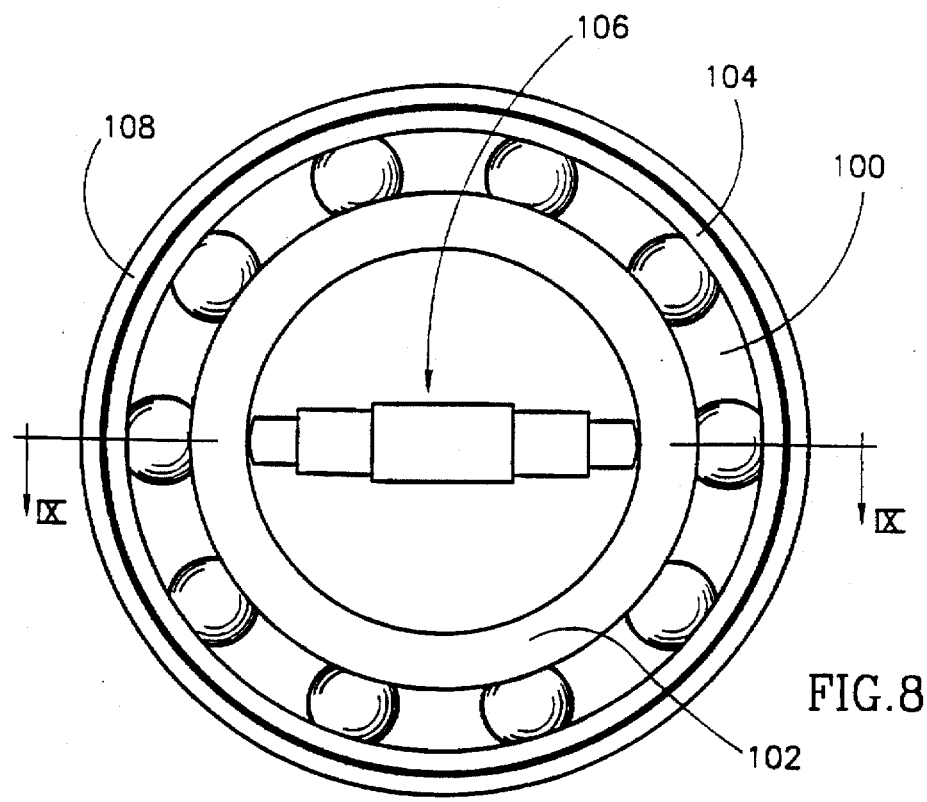
FIG. 8 is a schematic top view illustration of a second embodiment of the rotation units of the device of FIG. 1.
Figure 9:
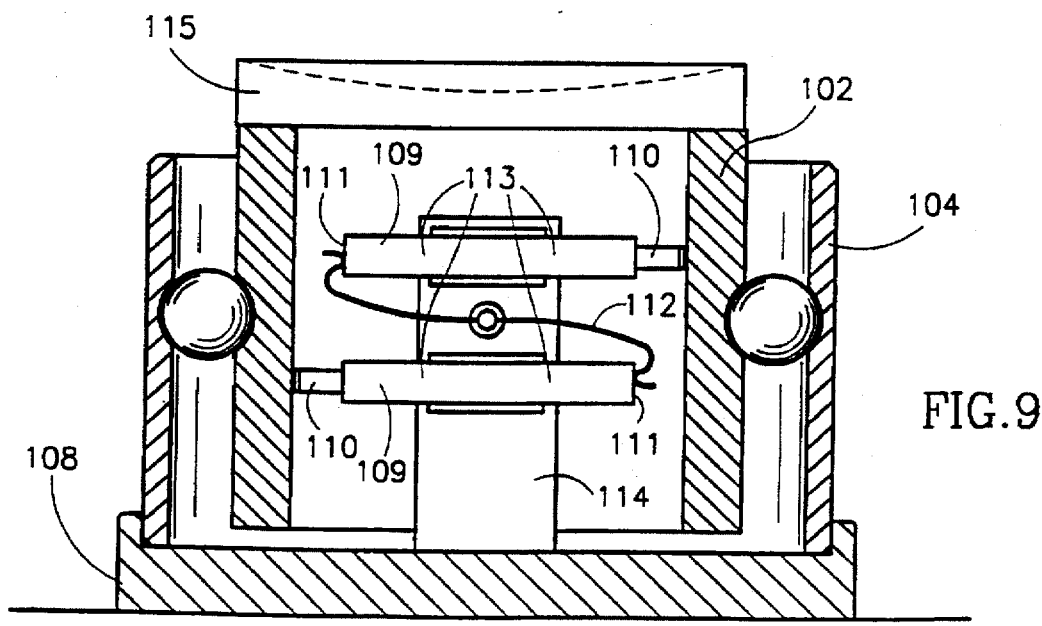
FIG. 9 is a schematic side view illustration, taken in the direction marked by arrow IX of FIG. 8, of the rotation unit of FIG. 8.

Reference is now made to FIGS. 8 and 9 which illustrate a further embodiment of the rotation units of the present invention. In this embodiment, the bearings are large enough for the motors to fit within the inner races of the bearings. FIGS. 8 and 9 detail one rotation unit, where FIG. 8 is a top view and FIG. 9 is a side view of the unit. FIG. 9 is taken in the direction marked by arrow IX of FIG. 8.

The rotation unit of FIGS. 8 and 9 comprises a bearing 100, formed of the inner and outer races 102 and 104, a motor unit, labeled 106, and a friction changing unit 108. The motor unit 106 can be any type of motor. In the example shown in FIGS. 8 and 9, the motor unit 106 is formed of two piezoelectric motors 109 of the type manufactured by Nanomotion Ltd. The driving elements 110 of the motors 109 press against the inner race 102, approximately at 180 degrees to each other. The inner race 102 is typically coated with a bushing material, such as alumina, so that the metal of the inner race will not abrade the driving elements 110. The bushing material can be glued or sprayed on via a plasma spray technique. Ends 111 opposite the driving elements 110 of motors 109 are connected together with a spring 112, such as a leaf spring. Spring 112 provides the two motors 109 with a pre-load. If necessary, motors 109 can be mounted on a support 114 which holds the motors at an appropriate height within the bearing 100 and which holds them at the zero locations 113 of the standing waves.

In this embodiment, a support 115 for spherical element 10 is mounted onto the inner race 102 and the friction changing unit 108 is connected to the outer race 104. In this embodiment, friction changing unit 108 is a flat plate on which the outer race 104 stands. Friction changing unit 108 operates similarly to the ceramic base 80 of the previous embodiment.

Figure 10:
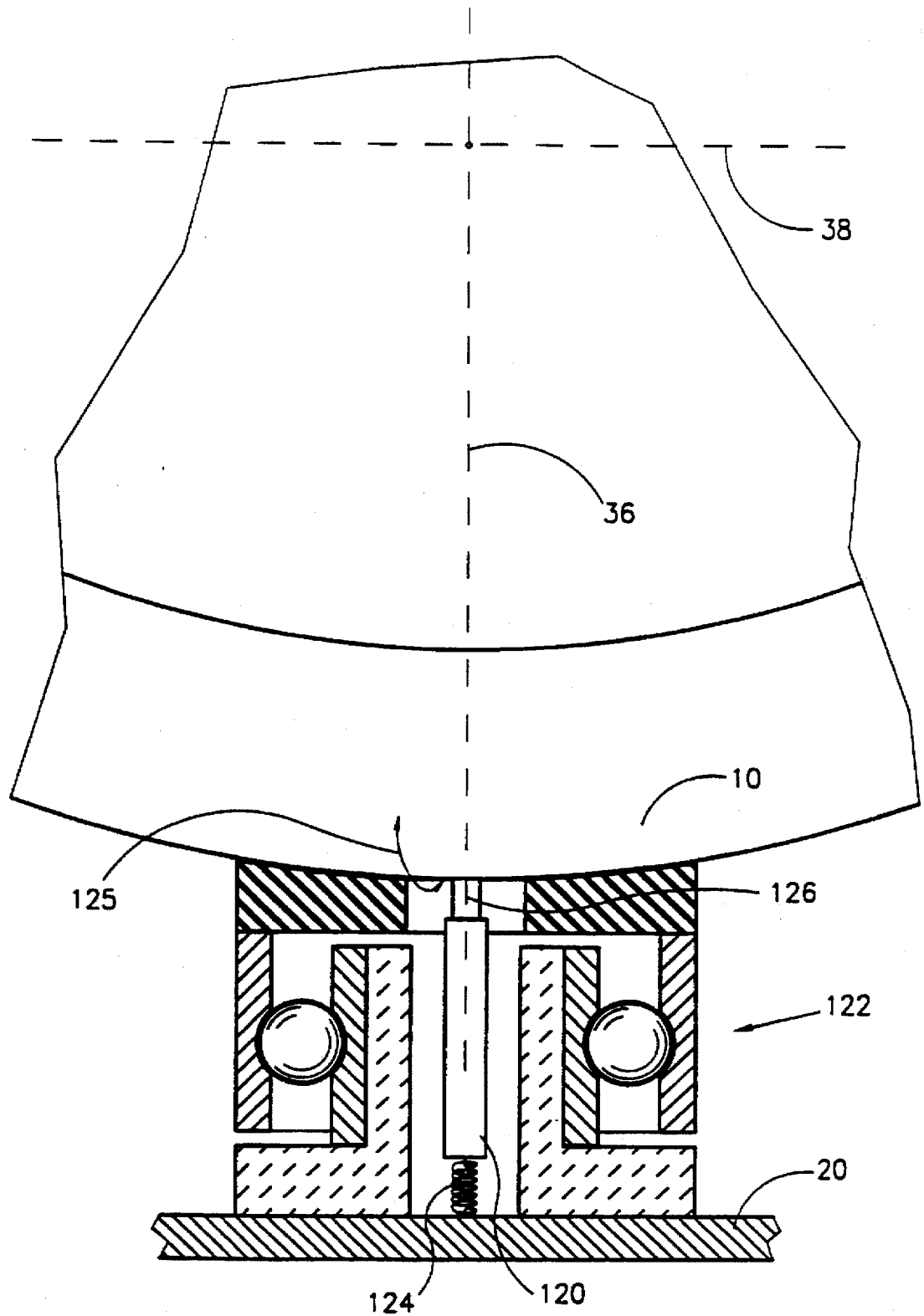
FIG. 10 is a side view schematic illustration of a further embodiment of the rotation units of the device of FIG. 1.

Reference is now made to FIG. 10 which illustrates a further embodiment, in side view, of the rotation units of the present invention.

In this embodiment, the motor unit, labeled 120, is located within axis defining unit, labeled 122, and directly presses against the spherical element 10. A spring 124 provides pre-load to the motor 120 by pushing against the housing 20. In order to ensure that the driving element 126, typically formed of alumina, does not wear out too quickly, the spherical element 10 should be covered with bushing material.

It will be appreciated that the axis defining unit 122 defines one axis, such as axis 36, and that motor 120 rotates the spherical element 10 about the axis 32 which is perpendicular to the axis 36 of the axis defining unit 122. As shown by arrow 125, motor 120 pushes the spherical element 10 in and out of the plane defined by the paper and thus, rotates the spherical element 10 about axis 38. As will be appreciated by persons skilled in the art, motor 120 provides the highest moment possible about axis 38.

Figure 11:
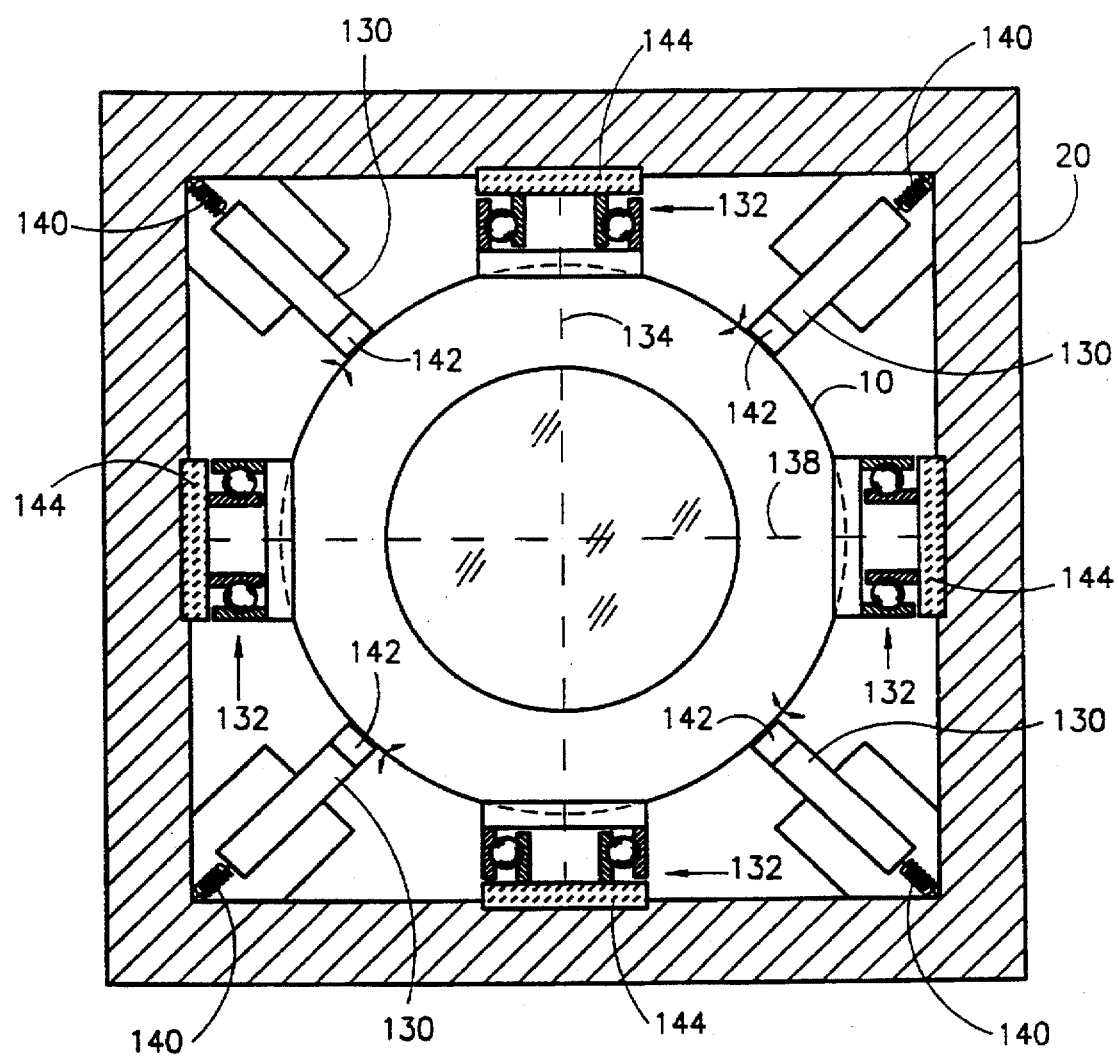
FIG. 11 is a schematic illustration of a second embodiment of the multiaxis rotation device of the present invention in which the motors and axis defining units are separate.

Reference is now made to FIG. 11 which illustrates another embodiment of the multiaxis rotation device of the present invention. In this embodiment, the motors, labeled 130, are separated from the axis defining units, labeled 132. As in the embodiment of FIG. 1, the axis defining units 132 define the axes 134 and 138 of rotation. However, in this embodiment, the motors 130 press directly against the spherical element 10. As shown in FIG. 11, motors 130 are located in the corners of the housing 20 and the pre-load is provided by springs 140 which press against the corners of the housing 20. Since the motors 130 do not operate along one of the axes 134 or 138, the action of the motors 130 provides a higher moment to the rotation of the spherical element 10 than in the embodiment of FIG. 1. The spherical element 10 should be covered with a bushing material so as not to wear down the driving elements 142 of motors 130.

In this embodiment, the four motors 130 continually operate together. The motors have to be located at opposite sides of a diagonal of the spherical element 10 such that the pressure of one motor 130 on the spherical element 10 is compensated by the pressure of the motor 130 on the opposite side of the spherical element 10.

The axis defining units 132 can be the same as those of FIGS. 1–4. However, since they do not need to provide a load against the push of the motors 130 (as in the embodiment of FIG. 1), the friction changing units, labeled 144, can be formed of just a ceramic base, as shown.

Figure 12:
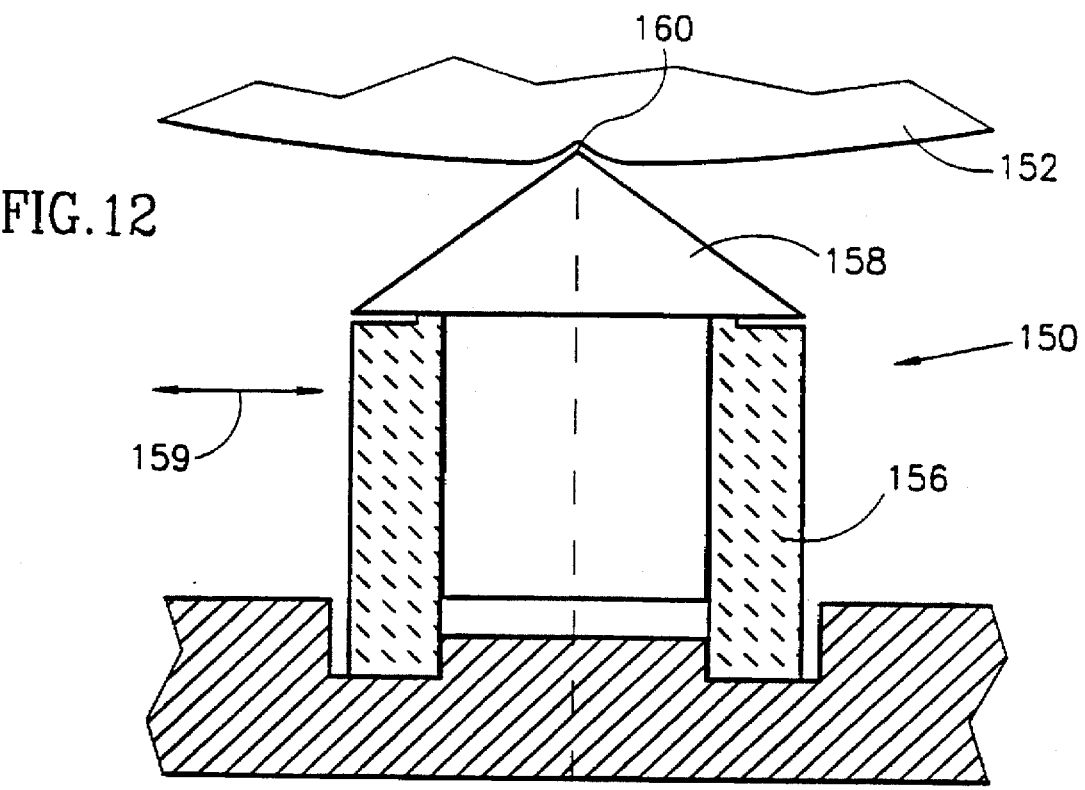
FIG. 12 is a schematic illustration of an alternative axis defining unit useful in the device of FIG. 11.

Reference is now made to FIG. 12 which illustrates an alternative embodiment of an axis defining unit 150 operative for the multiaxis rotation device of FIG. 11 on a relatively "soft" spherical element 152. The axis defining unit 150 comprises a friction changing unit 156 and a triangular support 158 about whose apex 160 the spherical element 152 rotates. The apex 160 defines one point of one of the axes of rotation. In this embodiment, there are no bearings since the motors 130 provide the rotation motion at a distance from the unit 150 and the apex 160 provides a point about which to rotate.

Friction changing unit 156 is a cylinder, similar in shape to the extension 82, upon which is mounted triangular support 158. Unit 156 is polarized in the direction perpendicular to the axes of the spherical element 10, as indicated by arrow 159, and is operative similar to the base 80. Thus, unit 156 provides motion to and from the spherical element 152. Depending on the size of the unit 156, electrodes (not show) can be placed on its top and bottom surfaces or on its inner and outer surfaces.

Figure 15:
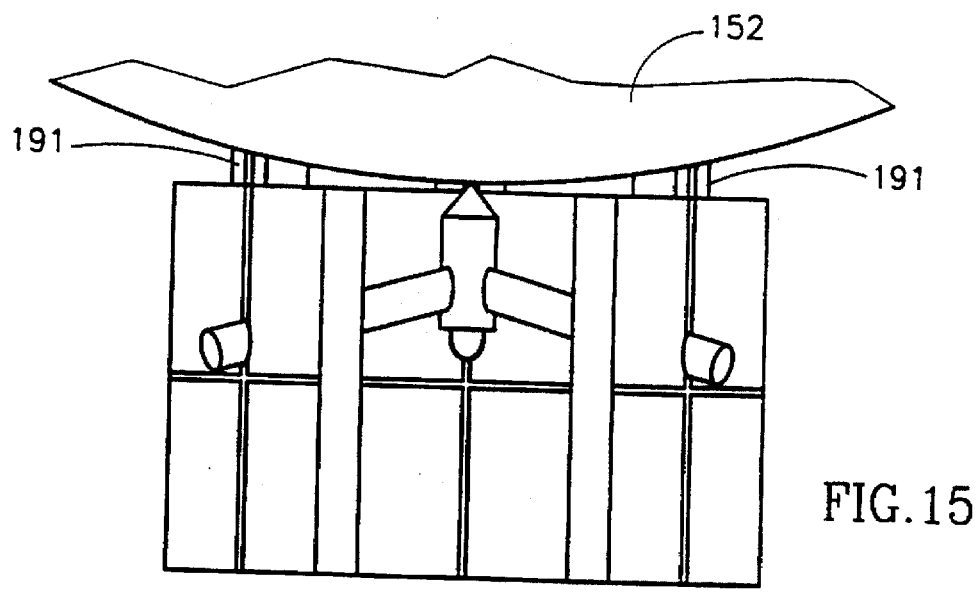
FIGS. 13, 14 and 15 are schematic isometric, top and side view illustrations of an alternative rotation unit useful in the multiaxis rotation device of the present invention, where
Figure 13:
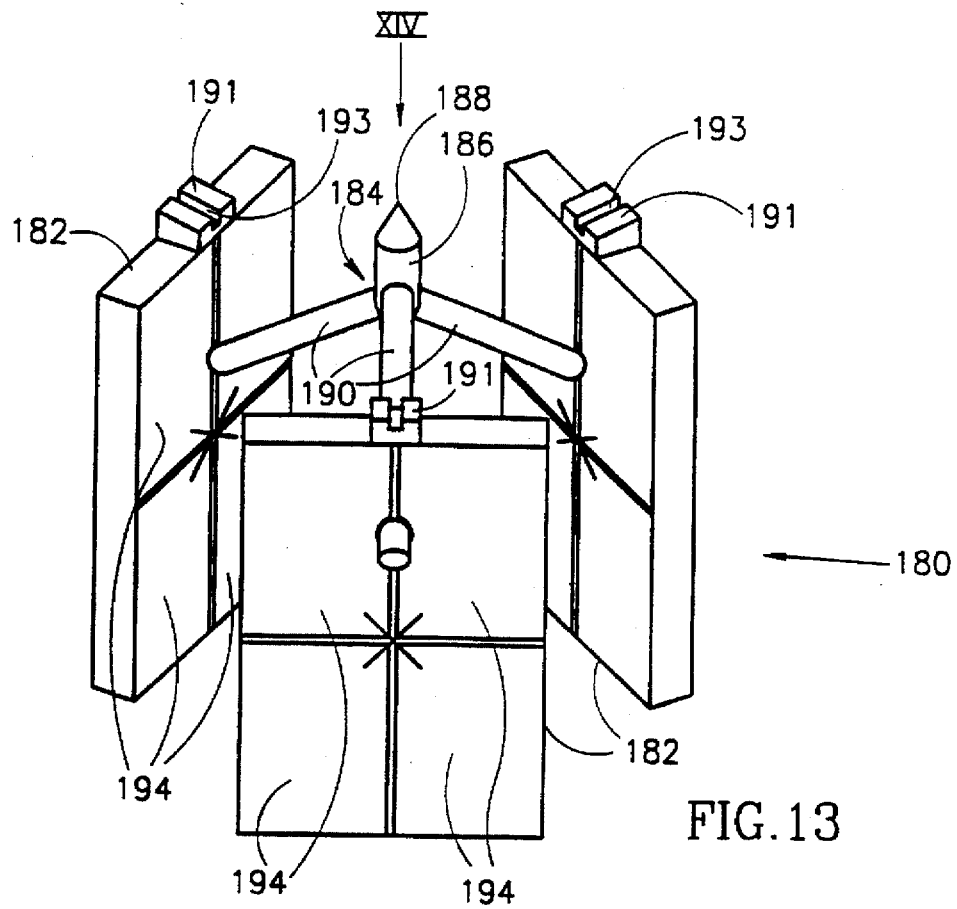
Figure 14:
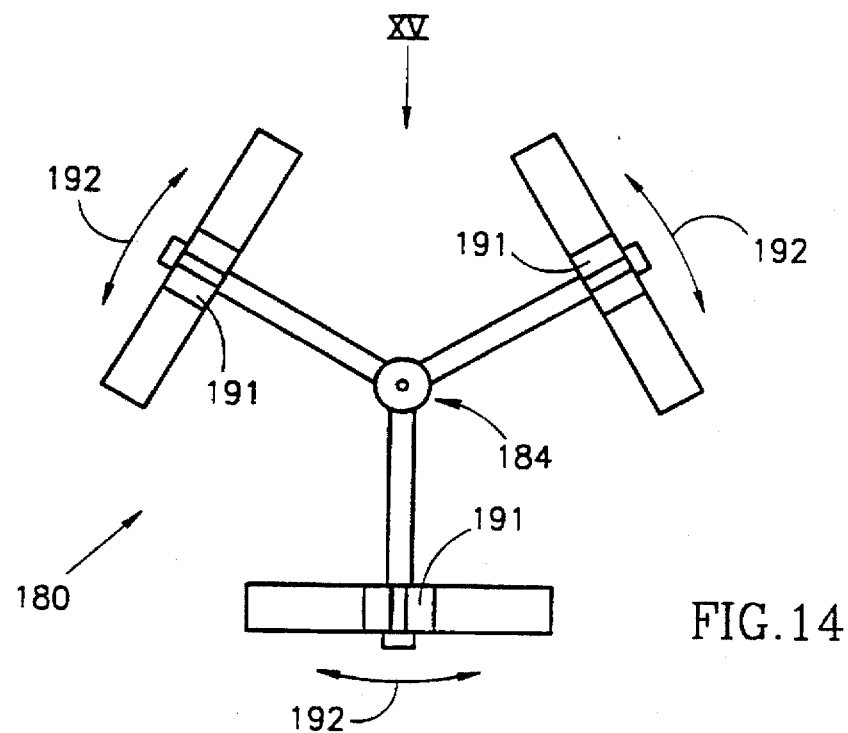

Reference is now made to FIGS. 13, 14 and 15 which illustrate a further embodiment, labeled 180, of the rotation unit of the present invention in which the motors and axis defining units form a single element. FIG. 13 is an isometric, schematic illustration, FIG. 14 is a top view, taken in the direction of arrow XIV of FIG. 13, and FIG. 15 is a side view, taken in the direction of arrow XV of FIG. 14, of the axis defining unit 180.

The rotation unit 180 comprises three ceramic motors 182 and a point support 184 connected to all three motors 182. Point support 184 comprises an axle 186 with an apex 188 and three rods 190 which connect axle 186 with the ceramic motors 182. Similar to apex 160, apex 188 provides one point of a rotation axis about which the spherical element 152 can rotate. The three rods 190 are of approximately equal length and are equally spread about a circle (120 degrees apart from each other). Typically, they connect to motors 182 at the zero point locations of the standing wave, as is known in the art.

Motors 182 are located equidistantly from axle 186 at a position to ensure that their driving elements 191 touch spherical element 152. How they touch spherical element 152 is shown in FIG. 15. The driving elements 191 typically have a groove 193 in them to minimize the amount of surface which contacts the spherical element 152.

FIG. 13 details the electrodes 194 of the motors 182 and indicates that each motor 182 has four oppositely connected electrodes 194. As described in Israel Patent Application 111,597 assigned to the common assignees of the present invention and incorporated herein by reference, the motors can either cause the spherical element 152 to move by pressing in and then pushing to one side or the other, or the motors can move in place, in which case, they just press and move away from the spherical element 152. In the first mode, only one, diagonal pair of electrodes 194, per motor 182, are activated with a symmetric sinusoidal voltage; one pair provides movement towards the right and the other pair provides movement to the left. In the second mode, all four electrodes 194, of each motor 182, are activated at once, typically in accordance with the timing diagram of FIG. 7B.

When rotation is desired, the motors 182 are all operated in the first mode, each in the same direction. When friction reduction is desired, motors 182 are operated in the second mode and thus, they press towards and pull away from the spherical element 152, As shown in FIG. 7B, in the second mode, the motors 182 are operated to spend more time pulling away from than pressing.

It will be appreciated that, for this embodiment, only one driver 32 (of FIG. 1) is necessary.

Figure 16:
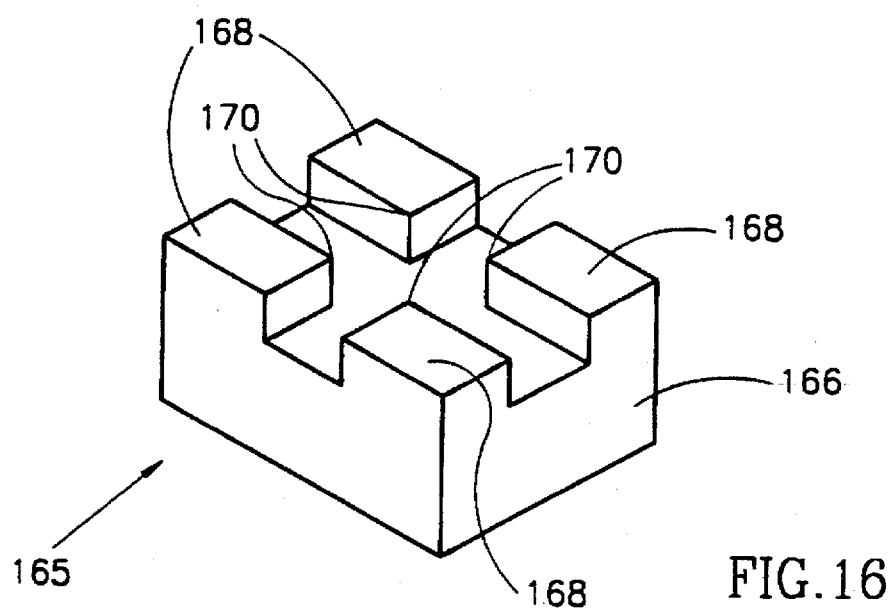
FIG. 16 is a schematic illustration of an alternative driving element, useful in the rotation unit of FIG. 13.

Reference is now briefly made to FIG. 16 which illustrates an alternative embodiment of the driving elements 191 of FIG. 13. In this embodiment, the driving element, labeled 165, comprises a base 166 integrally connected with four raised pads 168. The spherical element 152 sits on the four inner corners 170 (one from each of the pads 168).

Figure 17:
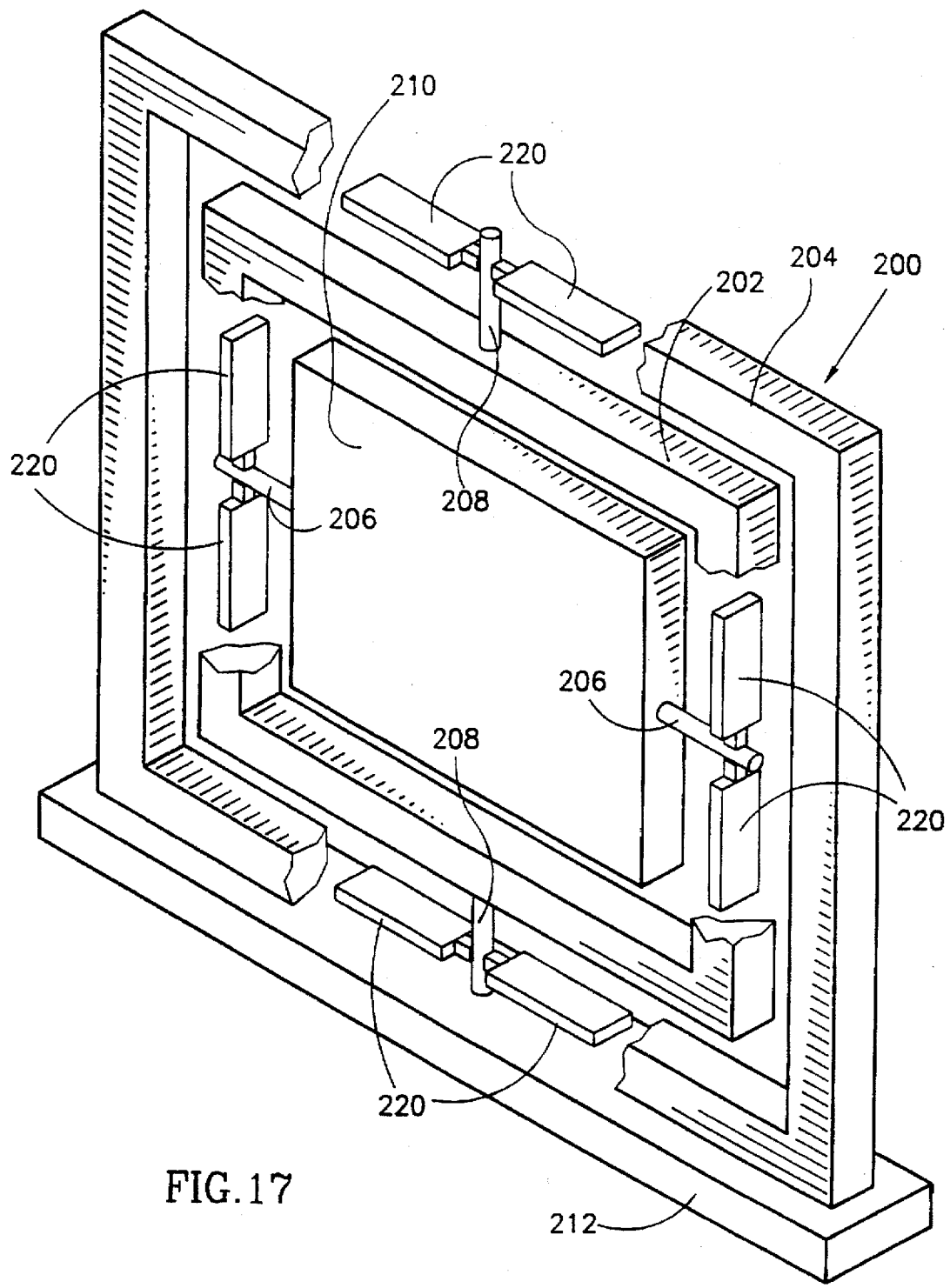
FIG. 17 is a schematic isometric illustration of a multiaxis gimbal system of the present invention.
Figure 18:
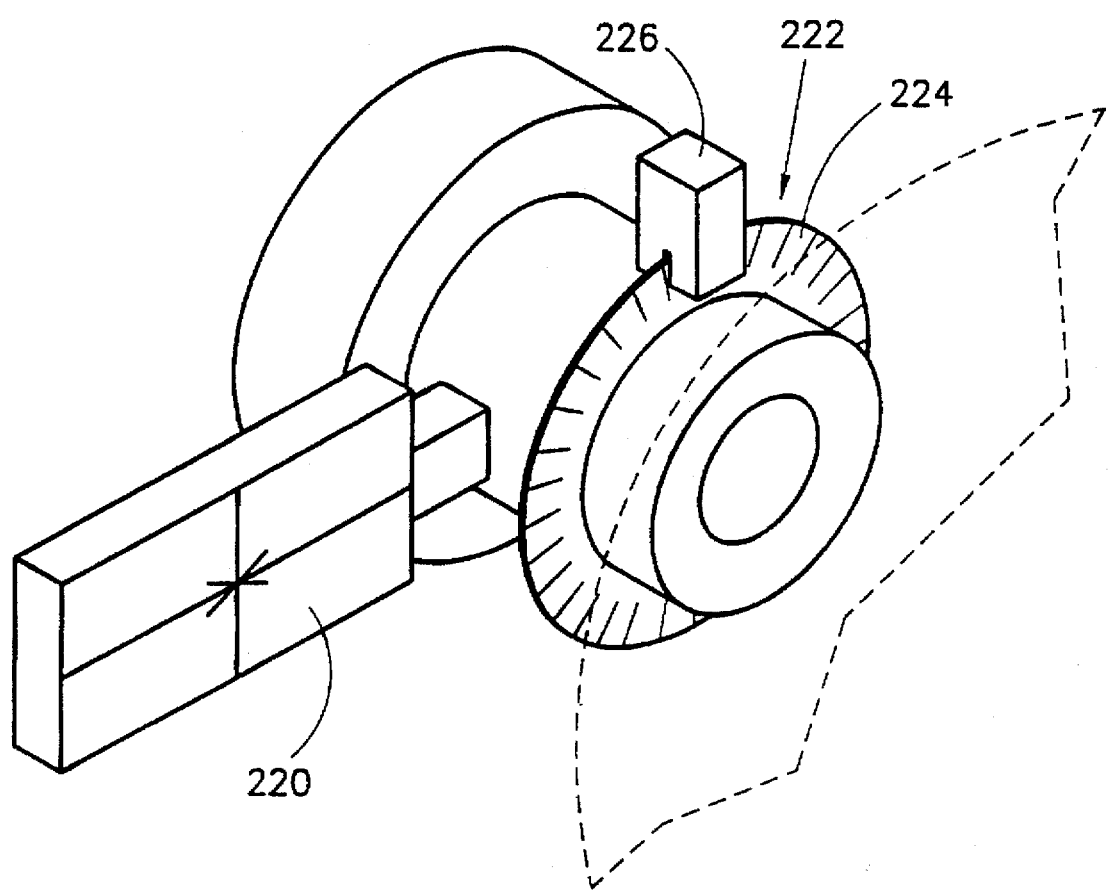
FIG. 18 is a schematic illustration of an encoder forming part of the gimbal system of FIG. 17.

Reference is now made to FIGS. 17 and 18 which illustrate a multiaxis rotation device implemented in a gimbal system. FIG. 17 is a cutaway schematic of the gimbal system. FIG. 18 is a schematic illustration of a measurement system for, for example, the system of FIG. 17.

The gimbal system, labeled 200, has an inner ring 202 and an outer ring 204. Each ring has axles where the axles 206 of the inner ring 202 are connected to a element 210 to be rotated and the axles 208 of the outer ring are connected to the inner ring 202. Outer ring 204 is connected to a base 212.

In accordance with the present invention, each axle is rotated by one or two ceramic motors 220 located opposite one another but working together to produce rotation of the relevant axle. Since the ceramic motors 220 are generally small, on the order of 10 mm in length, the ceramic motors 220 can be located within the rings 202 and 204. This enables the gimbal system of the present invention to be small and compact.

As briefly shown in FIG. 18, the axles 206 and 208 have angular rotation encoders 222, comprising an encoded ring 224 and a reader 226, on them to enable the gimbal system to be rotated to relatively precise locations. The encoders of FIG. 18 can be utilized in any or all of the previous embodiments.

It will be appreciated by persons skilled in the art that the present invention is not limited to what has been particularly shown and described hereinabove. Rather the scope of the present invention is defined by the claims which follow:

We claim:

1. A multiaxis rotation device for rotating a curved element about two, orthogonal axes, the multiaxis rotation device comprising:
   a. two pairs of motors for rotating said curved element about said two orthogonal axes;
   b. two pairs of axis defining units placed about said curved element, wherein each pair defines one of said two orthogonal axes, wherein each of said axis defining units comprises:
      i. a support for said curved element; and
      ii. means for pressing said support against and pulling said support away from said curved element in accordance with whether or not said motors are providing rotation about the axis defined by the axis defining unit.

2. A device according to claim 1 and wherein said means for pressing is formed of a piezoelectric ceramic.

3. A device according to claim 2 wherein said support comprises a bearing and a curved support element, wherein said piezoelectric ceramic is formed of a base, mounted onto said bearing, and a hollow extension extending within the center of said bearing.

4. A device according to claim 3 and also comprising electrodes on the top and bottom of said base and two electrodes within said hollow extension and two electrodes on the outside of said hollow extension, opposite the electrodes within said hollow extension.

5. A device according to claim 3 and wherein each of said motors is a piezoelectric ceramic motor.

6. A device according to claim 5 wherein said device comprises a housing and wherein each of said motors presses against the outside of the corresponding one of said bearings and against said housing.

7. A device according to claim 2 wherein said support comprises a bearing and a curved support element and wherein said piezoelectric ceramic is formed of a base, mounted onto said bearing.

8. A device according to claim 7 wherein each of said motors is formed of two piezoelectric ceramic motors located within an inner race of said bearing.

9. A device according to claim 5 and also comprising a housing, wherein each of said bearings has an inner race, wherein each of said motors is located within said inner race of its corresponding bearing and wherein said motor presses against said curved element and said housing.

10. A device according to claim 2 wherein each of said motors is located apart from said axis defining units and wherein each of said motors presses against said curved element.

11. A device according to claim 10 and wherein said support has an apex in contact with said curved element.

12. A device according to claim 10 and wherein said support has at least three points in contact with said curved element.

13. A multiaxis rotation device for rotating a curved element about two orthogonal axes, the multiaxis rotation device comprising:

a. two pairs of rotation devices for rotating said curved element about said two orthogonal axes, wherein each pair of rotation devices is located at opposite ends of diagonals along said orthogonal axes, and wherein each rotation device comprises;

i. a support having an apex for supporting said curved element; and ii. at least three piezoelectric ceramic motors located equidistantly from said apex and capable of pressing against, pulling away from and rotating said curved element.

14. A multiaxis rotation device for rotating a body about first and second orthogonal axes, the multiaxis rotation device comprising:

a. a first frame having first axles connected to said body along said first axis; and b. a second frame having second axles connected to said first frame along said second axis;

c. pairs of piezoelectric ceramic motors operating on each of said first and second axles and located within the appropriate one of said first and second frames.

* * * * *